(12) United States Patent
Meis et al.

(10) Patent No.: US 7,469,363 B2
(45) Date of Patent: Dec. 23, 2008

(54) COMPUTER NETWORK WITH DIAGNOSIS COMPUTER NODES

(75) Inventors: Harold Meis, Burgthann (DE); Thomas Tschaftary, Nürnberg (DE)

(73) Assignee: Baumuller Anlagen-Systemtech-Nik GmbH & Co., Nurnberg (DE)

(*) Notice: Subject to any disclaimer, the term of this patent is extended or adjusted under 35 U.S.C. 154(b) by 455 days.

(21) Appl. No.: 10/523,211

(22) PCT Filed: Jul. 29, 2003

(86) PCT No.: PCT/EP03/50349

§ 371 (c)(1),
(2), (4) Date: Aug. 29, 2005

(87) PCT Pub. No.: WO2004/014022

PCT Pub. Date: Feb. 12, 2004

(65) Prior Publication Data

US 2006/0143493 A1    Jun. 29, 2006

(30) Foreign Application Priority Data

Jul. 29, 2002    (DE) ............................... 102 34 634

(51) Int. Cl.
*G06F 11/00* (2006.01)
(52) U.S. Cl. .................... 714/47; 700/108; 700/110
(58) Field of Classification Search .......... 714/4, 714/47; 700/108, 110
See application file for complete search history.

(56) References Cited

U.S. PATENT DOCUMENTS

| | | | |
|---|---|---|---|
| 6,061,603 A * | 5/2000 | Papadopoulos et al. ....... | 700/83 |
| 6,405,099 B1 * | 6/2002 | Nagai et al. ................. | 700/159 |
| 7,062,343 B2 * | 6/2006 | Ogushi et al. ............... | 700/100 |
| 7,200,779 B1 * | 4/2007 | Coss et al. ................... | 714/48 |
| 7,203,560 B1 * | 4/2007 | Wylie et al. ................. | 700/110 |
| 7,310,750 B1 * | 12/2007 | Medin et al. ................. | 714/47 |
| 7,333,867 B2 * | 2/2008 | Kitamoto et al. ............. | 700/96 |
| 2004/0024481 A1 * | 2/2004 | Labourier .................... | 700/108 |

FOREIGN PATENT DOCUMENTS

DE    196 14 748 A1    10/1997

OTHER PUBLICATIONS

Barelmann, Dieter and Woeh, Markus, Via Internet: "Watching processes and reading machine reports", vol. 118, No. 20, Berlin, DE.

* cited by examiner

*Primary Examiner*—Marc Duncan
(74) *Attorney, Agent, or Firm*—Frank H. Foster; Kremblas, Foster, Phillips & Pollick (57) ABSTRACT

The invention relates to a computer network for configuration, installation, monitoring, error-diagnosis and/or analysis of several physical technical processes, in particular electrical drive processes, which occur under the control, regulation and/or monitoring of several process computer nodes, connected by means of at least one common communication system to at least one diagnosis computer node, in which one or several configuration, monitoring and diagnosis services and/or functions are implemented, provided for the processes and/or the process computer nodes and/or the data processing processes running therein, whereby the common communication system is achieved by means of the Ethernet, or a similar asynchronous and/or bus or communication system working with a stochastic access method.

25 Claims, 7 Drawing Sheets

COMPUTER NETWORK WITH DIAGNOSIS COMPUTER NODES

CROSS-REFERENCES TO RELATED APPLICATIONS

This application is a submission to enter the national stage under 35 U.S.C. 371 for international application number PCT/EP2003/050349 having international filing date 29 Jul. 2003.

STATEMENT REGARDING FEDERALLY-SPONSORED RESEARCH AND DEVELOPMENT

Not Applicable

REFERENCE TO AN APPENDIX

Not Applicable

BACKGROUND OF THE INVENTION

1. Field of the Invention

The invention relates to a computer network for the configuration, installation, monitoring, error diagnosis and/or error analysis of plural technical-physical processes. These may be in particular electrical drive processes which run under control, regulation and/or monitoring by plural process computer nodes (in the example of an electric drive system: drive regulator). The process computer nodes are connected to at least one diagnosis computer node via a shared communication system. In the diagnosis computer node, one or more configuration, monitoring and diagnosis services or functions is/are implemented, which are allocated to the processes and/or the process computer nodes and/or to the data processing operations running therein.

The invention further relates to a diagnosis computer node for the said network. This is formed as a server with interfaces for at least one database and for communication with at least the process computer nodes and with other client computer nodes. The invention further relates to a communication computer node or a communication module, the latter being formed as a software and/or firmware module, which is respectively suitable for use in the said network.

2. Description of the Related Art

From a conference volume to accompany the congress "SPS IPC Drives", which took place in Nürnberg in November 2001, the technical article "Info-Portal für anlagenübergreifende Prozessvisualisierung und -management via Internet" (authors: Andreas Kitzler und Werner Felten) was disclosed. This proposed a communication structure in which plural, mutually independent automation systems, cells or appliances may be combined, monitored, visualised and the like via an information port. At the information port, access can be gained to the Internet. The communication between the automation cells (known as Supervisory Control and Data Acquisition—SCADA) on the one hand and the central web server of the information port on the other is effected via standard interfaces on the basis of the extensible mark-up language XML. To this end, each automation system is provided with what is known as an XML-agent for communication with the information port on the basis of TCP-IP. Thus management should be able to evaluate in a qualified manner various automation cells or SCADA systems via the web. However, the individual sensor data have to be collected on the level specific to them, prepared there and made available to the information port via the XML agent before they can be transported from the information port via the web.

From DE 196 14 748 (A1-published and unexamined specification, and C2-patent specification), an error diagnosis system is known in which a diagnosis computer node communicates via plural bus systems also on the basis of the communication protocol TCP/IP (Transport Control Protocol/Interface Program) with control station computer, control process computer and field process computers. For communication between the field process computers on the one hand and the diagnosis computer node on the other, a serial field bus according to the standard RS485 is used, wherein the diagnosis computer node dominates the serial field bus (RS485) according to the master/slave principle. The bandwidth for the data transmission (RS485 interfaces) is not sufficient with the increasing data inundation. The data to be presented on the user interface cannot be transmitted quickly enough due to the ring communication structure within a field process computer cluster. It takes about 50-60 ms to scan one parameter—in appliances with about 500 drives, for example, any error occurring would only be notified after more than a minute. Each parameter is transmitted individually, and the transmission of software packages is not possible.

BRIEF SUMMARY OF THE INVENTION

The object of the present invention is to develop a hardware and in particular software tool for the diagnosis of complex technical appliances and systems which is tailored to the requirements and needs of the user and in particular meets the following requirements:

Versatile functions for monitoring and diagnosing large drive systems:

The object of the invention is to develop a hardware and in particular software tool for monitoring and diagnosing in particular large drive systems. The diagnosis system is intended to offer comprehensive, versatile functions which are tailored to the currently very different needs of the various user groups of the client.

(2) Easy-to-use, transparent user interfaces:

The user interface of the diagnosis system is the only part of the software with which the client comes into contact. In this sense it is the "bulletin board" of the software and is critical for acceptance and judgment thereof by the client. In planning the user interface, this should be so contrived that it is easy to use even by not very highly trained staff. The large number of data to be indicated in the diagnosis of large appliances must be graphically prepared and presented in an ergonomic diagram to the user.

(3) Shortening of the time necessary to detect a possible error:

The usefulness of the diagnosis system to the client will be that he is presented with data necessary for detecting and correcting the error immediately after an error has occurred. Thus the time can be reduced during which the appliance is not productive.

(4) Situation-dependent presentation of diagnosis data

The diagnosis system should make available the right data at the right time at the right place:

Preparation of the diagnosis information according to the requirements of the respective user circle (e.g. appliance operator, technician, installer)(→the right information)

Indication close to the time of diagnosis data directly after an error has occurred (→at the right time)

Access to THE DIAGNOSIS SYSTEM by any PCs of the client without installation cost—both in the local client network and via remote access (→at the right place).

(5) Reduction of critical appliance states by prophylactic maintenance and constant monitoring of the appliance:

In future, the diagnosis system is to contain mechanisms which help to detect possible oncoming failure of appliances and to inform the client. Thus the reliability of the drive system can be further increased.

(6) Comprehensive diagnosis/measuring operations via rapid Ethernet interfaces, including the Ethernet overall concept of the machine in order for example to measure, record and evaluate a reference signal of a real leading axle.

(7) Prophylactic diagnosis (e.g. transmitter failure likely in . . . days).

(8) An "expert system" is intended to ensure error localisation within 10 minutes maximum and simplify error correction substantially.

(9) Web browser functions.

(10) The diagnosis system must be able to run on plural platforms (e.g. diverse control stations).

(11) Integrated data protocolling/analysis (register values, commands) must be available without additional hardware (data analyser).

(12) Cyclical data protocolling at a central database server.

(13) Access option for the machine manufacturer to drive systems supplied via remote diagnosis.

(14) Operator guidance and parameter handling (configuration, installation, error search, software updates) are to be substantially improved.

(15) Development of branch-overlapping solutions

In spite of taking clients' wishes into account, the diagnosis system for branch-overlapping use is to be developed so that use in other branches (e.g. machine tools, textile machines) is possible without great complication/expense.

(16) Preparation of software tools for the installation of drive systems with in future up to 500 axles Drive systems with more than 300 axles can only be installed without software support with excessively high cost. To this end, with the diagnosis system according to the invention a suitable software tool is to be developed.

(17) Shortening of the installation time and reduction of the installation costs:

By means of the diagnosis system, the costs of installation are to be reduced in the long term by the delivery of suitable software-supported methods.

(18) Worldwide access to the technical-physical processes of the appliance, in particular drive systems, for rapid, economical diagnosis:

For rapid and reliable service and for appliance diagnosis, worldwide access to the drive system will be possible.

On the other hand, in order to prevent the disadvantages from the prior art from arising in the computer network having the features mentioned in the introduction, it is proposed according to the invention that the shared communication system between the process computer node and the diagnosis computer node is realised with the Ethernet or another bus or communication system operating asynchronously and/or with a stochastic access method. An access method of this type is known for example under the abbreviation "CSMA/CD" (Carrier Sense Multiple Access/with Collision Detection). This industrial Ethernet use for realising a communication infrastructure permits a higher bandwidth for data transmission compared to the prior communication via RS485 and the associated USS protocol, so that larger quantities of data can be transmitted from the process computer node to the diagnosis computer node. There is an increasing need for this, due to the increasing complexity of the technical appliances with an increasing number of process computer nodes and associated technical-physical processes. Furthermore, the Ethernet has proved a substantial standard in offices for transmitting large quantities of data. By the use according to the invention of the Ethernet with the protocol TCP/IP also known per se, the path is cleared for the diagnosis system according to the invention to be compatible with and/or combined with the Internet. Thus the advantage is gained that diagnosis data can be sent via the Internet. In addition, a technical appliance can be monitored with a large number of processes from any client node, in particular via the Internet.

In order to be able to process the extensive quantities of data arising in a practical manner, a decentralised diagnosis together with pre-processing is advantageous. It is also practical to move extensive diagnosis functions as close as possible to the technical-physical process or apparatus concerned. In this respect, according to an advantageous embodiment of the invention, a communication unit or computer node is interposed between the Ethernet or the other bus or communication system and at least one of the process computer nodes, thus connecting the respective process computer node to the Internet or other bus or communication system. The communication computer node or communication unit can additionally also undertake event- and/or enquiry-based communication to the diagnosis computer node.

In particular, when in a further configuration of the invention the communication unit or the communication computer node is so formed that it communicates via XML protocol and/or as an XML-based interface (XML—Extensible Markup Language) with the diagnosis computer node, in projecting and configuring the technical appliance to be monitored thereby, it is possible to react very flexibly and with relatively low cost to technical requirements and client wishes. On the basis of the invention, a standardised, versatile network-computer structure can be created, which can be easily extended by further functions. Particularly, with the use of XML protocol and/or XML-based interfaces, the diagnosis data can be so prepared from the process computer node and/or communication node for the diagnosis computer node that these data can be transmitted easily via the Internet from the diagnosis computer node to client computer nodes.

In order to be able to manage the extensive quantities of data in a practical manner via decentralised pre-processing, according to one embodiment of the invention it is provided that the communication unit or communication computer node is provided with functionalities for error search or diagnosis in the region of at least one of the process computer nodes or of a technical-physical process. With this notion, extensive diagnosis functions can be located close to the components concerned.

The Internet-compatibility of the diagnosis system according to the invention is enhanced if according to an embodiment of the invention the diagnosis computer node is formed to make available or at least support web-based user interfaces for client computer nodes. This can be effected via data remote transmission and/or a long-distance traffic network (e.g. Internet). It is further within the scope of the invention if in addition the diagnosis computer node is provided with function components which support the education of the user interfaces in the client computer node.

It is problematic whether the user at a client computer node must confident that the client user interface is reproducing (diagnosis) data and information which are still substantially up-to-date or close in time. Any failure of the diagnosis server should be detectable, and furthermore errors and other events in the technical-physical process and/or process computer node are to be capable of being communicated to the user close to time via the user interface of the client computer node allocated to him.

To solve this set of problems, within the scope of the general inventive notion, a diagnosis computer node having the following features is proposed for use as a server in the network outlined above:

The diagnosis computer node is set up to operate as a server and has interfaces to at least one database, for communication with the communication and/or process computer node and for communication with other client computer nodes;

The one or more interfaces to the other client computer nodes are realised by using a Servlet container (known per se), which transmits diagnosis data to the client nodes;

These diagnosis data are obtainable from the interfaces for communicating with the communications and/or process computer node;

The one or more above-mentioned interfaces which are allocated to the communication and/or process computer nodes are realised on the basis of the Ethernet;

A diagnosis channel is formed, which comprises one or more Ethernet interfaces, which are allocated to the communication and/or process computer nodes;

The diagnosis channel further comprises an event management unit, which can access the database and can process diagnosis data obtained at the Ethernet interfaces;

Further, the diagnosis channel comprises an event monitoring unit, which is formed on the basis of the Servlet container and makes available output data from the event management unit to one or more Applets on external client computer nodes.

It is thus possible to transmit data, in particular diagnosis data in cycles between the diagnosis computer node and the user interface of a client computer node. Thus a user at the client computer node can be informed close to time of events arising in the region of the process computer node and/or of the technical-physical processes. Thus a wide variety of appliance information can be made available on the user interface of the client computer node in a comfortable manner. The data transmission can be carried out particularly advantageously with Java technologies, in particular a Java Servlet on the diagnosis computer node as a server and a Java-Applet in the client computer node. Thus it is also possible to make available diagnosis information in the form of websites to a user on the client computer node. In this case, the use of Java-Applets offers very versatile representation options, which are easily extensible by bought-in Applets with graphical capabilities.

The solution to the above set of problems is assisted by the diagnosis channel according to the invention in the diagnosis server, by means of which a cyclic communication can be effected, wherein data packages are regularly exchanged. If a data package is missing, it can be detected in the client computer node that an error has occurred ("event+heartbeat"). The heartbeat corresponds as it were to the dead-man's button known in particular in the field of railway safety technology. By means of the diagnosis channel, therefore, a display of diagnosis data originating from the process computer node can as it were be triggered via diagnosis server or diagnosis computer node to the client computer node on his user interface. The representation of the error on the user interface is no longer dependent on an enquiry being sent to the diagnosis server by the client computer node due to the diagnosis channel according to the invention. Rather, the process computer nodes, optionally via individually allocated communication nodes, can itself indicate as it were new events, in particular errors. This mechanism is substantially supported by the diagnosis channel in the diagnosis computer node in that diagnosis or error data notified via the event monitoring unit by the process computer node are forwarded to the user interface of the client computer node for a user at that interface.

According to a particular configuration, the interfaces in the diagnosis computer node are contrived for communication with the communication and/or process computer nodes by means of XML protocols. Thus proprietary solutions which have restricted applicability are avoided.

In the diagnosis computer node, all diagnosis data are intended to be made available to the user interfaces on the client computer nodes in a web-based manner. It has turned out to be particularly advantageous for this purpose to have a combination of the web-server Appache with the Servlet-engine "Tomcat".

In the diagnosis computer node according to the invention and indicated above, the diagnosis channel ensures in the case of an event, in particular error, to prompt a reaction from the client computer node thereto with his user interface. If an error or event occurs, corresponding diagnosis data are picked up at the Ethernet interface of the diagnosis channel, and are allocated to the communication units, communication and/or process computer nodes. The event management unit can access the diagnosis or event data in the form of a telegram for example at the Ethernet interface. The event or diagnosis data are processed and a corresponding datum is written into the database. The output data from the event management unit pass to the event monitoring unit applied in the Servlet container. In the example of the Intranet, this event monitoring unit transmits at its output a datum advantageously direct to the client computer node, without the interposition of a web server. The datum contains a prompt to demand representative diagnosis data from the diagnosis server due to events or errors. Thus the need for constant polling throughout the period of operation, which would require increased data transmission capacities, is avoided.

To connect the process computer node to the Ethernet or another asynchronously operating communication system with the diagnosis computer node, and in particular to create the option of an event-based communication between process computer nodes and diagnosis computer nodes, extensive diagnosis functions being located as close as possible to the technical-physical process, in the scope of the general inventive notion, a communication computer node or a communication unit are proposed as a software and/or firmware module, which is suitable for use in the computer network outlined above and is distinguished by the following features:

The communication computer node or the communication unit has a first interface which is allocated to the at least one diagnosis computer node;

This interface is programmed or formed for communication via protocols of the TCP/IP family, including UDP/IP, preferably on the basis of the Ethernet;

The communication computer node or the communication unit has one or more second interfaces which is/are allocated to one or more process computer nodes;

The first and one or more second interfaces may be coupled together via one or more information brokers;

The one or more information brokers are respectively set up in terms of program and/or circuit technology as sub-units for bidirectional, enquiry- and/or event-based data communication, which takes place between the first and the one or more second interfaces.

The purpose of the communication unit or communication computer node is to roll out all communication tasks between the process computer node and its outside world. This includes for example access to parameters of the process computer node, e.g. of the drive regulator, the down- and up-load of regulator firmware for example and associated data records, as well as the delivery of diagnosis functionalities.

With respect to the realisation of hardware of the communication node according to the invention, it might be advantageous to manufacture a free-standing structural unit with the communication functions incorporated therein and to mount this on the printed circuit board for the process computer node. Alternatively, the communication node hardware may be incorporated wholly or in part in the circuit on the printed circuit board of the process computer node and/or on that of the diagnosis computer node. Alternatively, it is within the scope of the invention to realise the communication node as a "PC" as it were with its own housing, which can be snap-fitted on to a rail-type mount for the process computer node.

As an operating system for the communication node according to the invention (communication unit or communication computer node), the use of Linux has been found advantageous. In addition, C++ is suitable as a sufficiently versatile and powerful programming language.

With the concept according to the invention of the communication node between the process computer and diagnosis computer, there is the option for transmitting data to the outside world via XML-based protocols (instead of proprietary protocols). With the mark-up language XML, which is widespread and known per se, for Internet applications in combination with the delivery of platform-independent XML parsers, there is the further option of simply exchanging data in heterogeneous system environments. By way of validation mechanisms (XML models) that are already available, the structure and admissible content of a telegram can be established simply, and testing for quality takes place automatically. As a character-based protocol, an XML-based telegram is easy to generate and if necessary to process by hand or by simple scripts.

In order to be able to implement the most extensive diagnosis functions as close as possible to the technical-physical process, according to an advantageous embodiment of the invention it is proposed that the one or more information brokers comprise function components which are formed to perform an error search or diagnosis in the region of the process computer node and/or technical-physical processes. In particular in this connection, a further advantageous embodiment of the invention involves the installation of interpreters for the loadability of scripts known per se on the communication computer node or unit, which interpreters are formed for access to function elements or functionalities in the information broker(s) for the purpose of carrying out monitoring and diagnosis functions. One advantage achievable thereby consists in the more effective error search: by means of the scripts in combination with the language PERL, in a relatively simple manner, efficient error search conditions can be installed or loaded by the diagnosis computer node on the communication node. Thus the functionality available on the communication node can be extended once again.

It is within the scope of the invention that the communication unit or the communication computer node in certain cases operates as a server with respect to the diagnosis computer node (as client) if on the part of the diagnosis computer node requirements are present at information services, which are to be realised for example by information brokers in the communication node.

BRIEF DESCRIPTION OF THE SEVERAL VIEWS OF THE DRAWINGS

Further details, features, advantages and effects on the basis of the invention will appear from the following description of preferred embodiments of the invention and from the drawings given by way of example. The drawings show.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Figure 1:
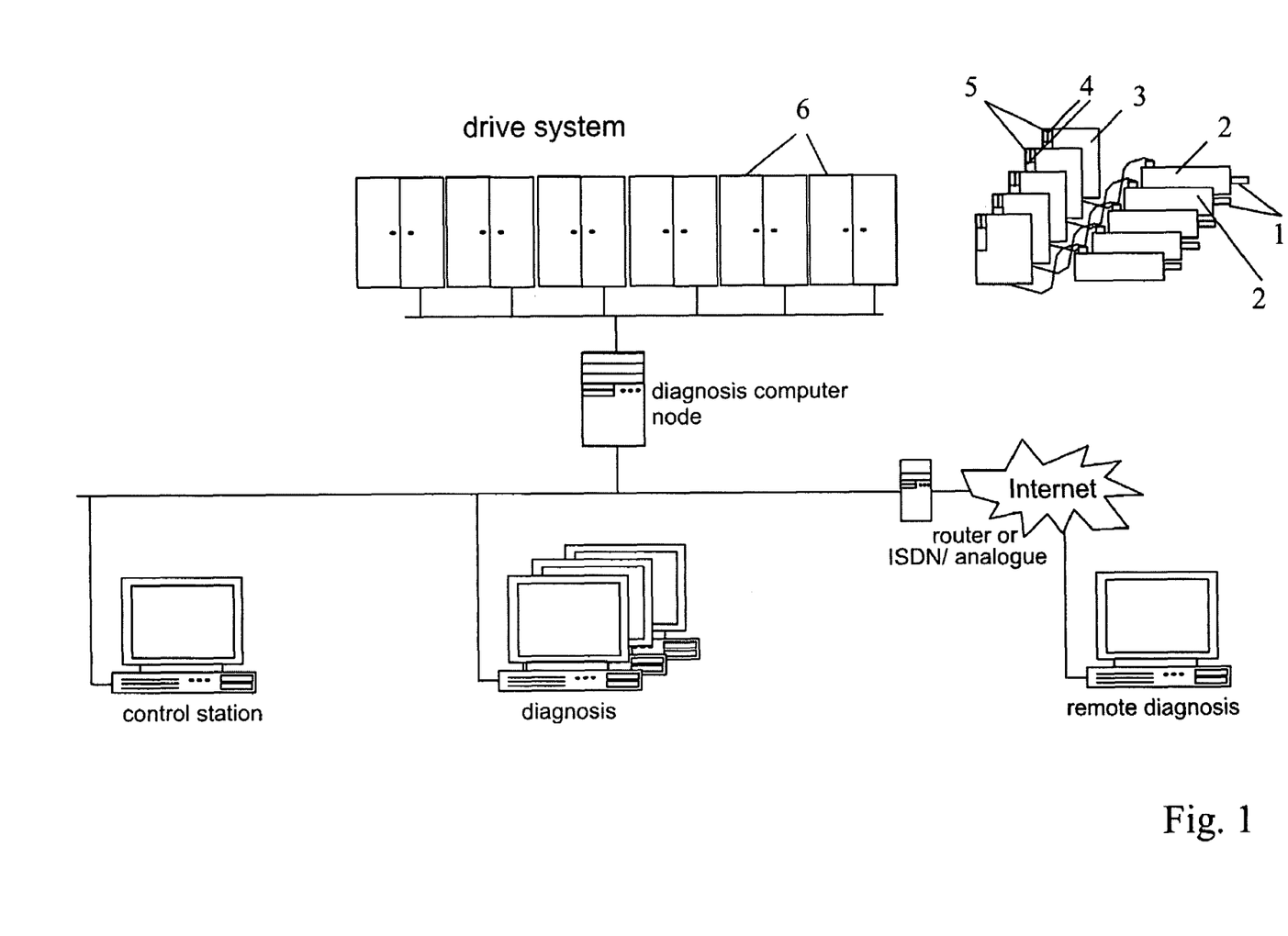
FIG. 1 a schematic appliance diagram of the diagnosis system according to the invention with local and worldwide access to diagnosis data.

According to FIG. 1, an electric drive system for a large number of axles 1 to be driven synchronously with one another, e.g. of a printing press provided with a large number of electric motors 2, each driving one axle 1. The electric motors 2 are each triggered or regulated via respective converters 3 with upstream process computer nodes 4, realised in the present printing press drive system as drive regulators. To communicate with a diagnosis computer node, respective communication computer nodes 5 are connected upstream of the process computer nodes. The converter 3, the process computer node 4 and the communication computer node 5 can be incorporated structurally into a common assembly, as is shown in the drawing, which is housed in a respective switch cabinet 6.

According to FIG. 1, the diagnosis computer node can also communicate with a control station, plural client computer nodes for diagnosis and via an Internet router or ISDN or in an analogue manner via the Internet with one or more geographically remote client computer nodes for remote diagnosis.

Thus the diagnosis data prepared at the respective drive process of the electric motors 2 by means of the process computer node 4 and/or of the communications computer node 5 may be retrieved via the diagnosis computer node both locally and from any other location.

Figure 2:
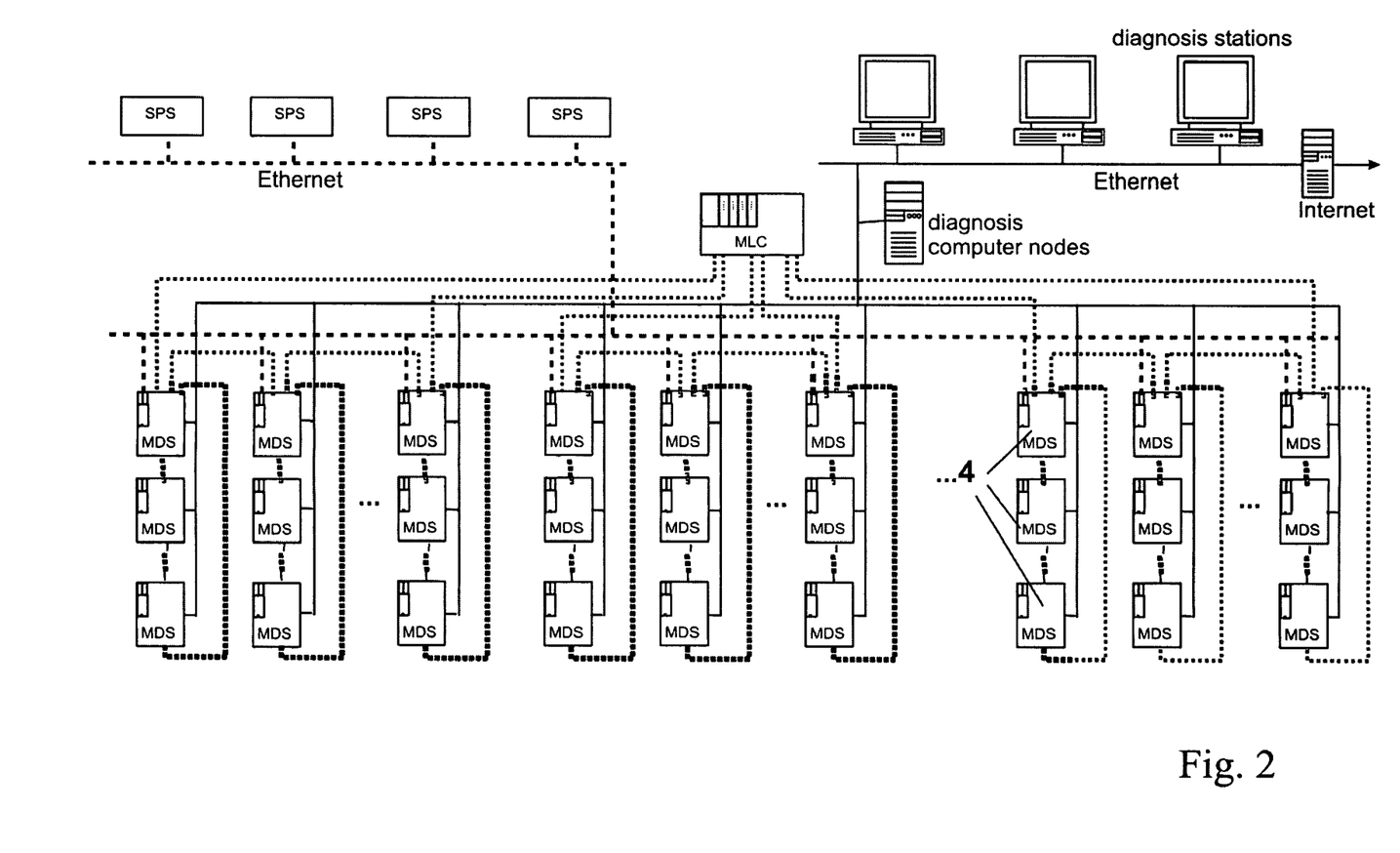
FIG. 2 a schematic block diagram of an example of a communication system of an electric drive system provided with the diagnosis system according to the invention.

According to FIG. 2, the individual process computer nodes 4 are connected together in the context of a ring structure for synchronised communication, in which case one of the process computer nodes 4 (the one printed darker in each case in FIG. 2) always operates as the communication master. This simultaneously has an interface for asynchronous communication via the Ethernet with plural control computer nodes SPS. In order also to support cross-communication between individual rings with process computer nodes 4, a multi-link controller MLC is also introduced as a structural element (known per se from U.S. 2003/0100961 A1).

In the reference plane, (diagnosis) data are constantly being required from the plane of the process computer node 4. These are essentially system data such as status and error messages, maintenance data and records for quality control. In order to evaluate the data, a diagnosis computer node is available in the reference plane as is shown in FIG. 2. In this case also, the Ethernet known per se is also made available as a communication medium both with the individual process computer nodes 4 and also with the diagnosis stations in the reference plane, which may form client computer nodes with the user interfaces. The OSI layer model known per se permits complex communication mechanisms between the process computer plane and reference plane. Since the diagnosis is to be effected independently of the remaining communication, each process computer node 4 is reachable via the Ethernet by the diagnosis computer node (and vice versa). Thus, inter alia, the advantage is gained that communication problems in the synchronised ring bus of the process computer node can be mutually detected.

Definition of important terms:

Event An event is a datum which is sent by a drive regulator (process computer node at the technical-physical process) upon occurring at the diagnosis server (diagnosis computer node). It appears in the event display of the user interface and in the logbook. Events are for example error messages, messages about the start/stop of records, maintenance messages etc. Every event has an unambiguous event identification via which an event description can be retrieved in the documentation.

Record With a record, any parameter curves can be picked up by any regulator and stored in a database.

Monitoring view The monitoring view is a graphic representation of one or more parameters of one or more regulators. It serves to monitor the values curve of these parameters for deviations from the norm (e.g. monitoring of the motor temperature).

Parameter list The parameter list contains all parameters available to one type of regulator.

Long-term record A record whose data are stored on the diagnosis server in a database. Opposite to ring memory record.

Ring memory
record A record whose data are stored in a ring memory of the process computer node. Only upon completion of the record can the data be stored on the diagnosis server.

Configuration
Wizard A sequence of individual pages on which the user can make settings. Each step in the configuration comprises a number of functions and is shown on one page. According to what the user does in the previous step, a corresponding consecutive page is displayed (e.g. in the configuration of the record: option in step 1: ring memory or long-term record: according to the selection, the user receives pages displayed for configuring the ring memory or the long-term record).

Figure 3:
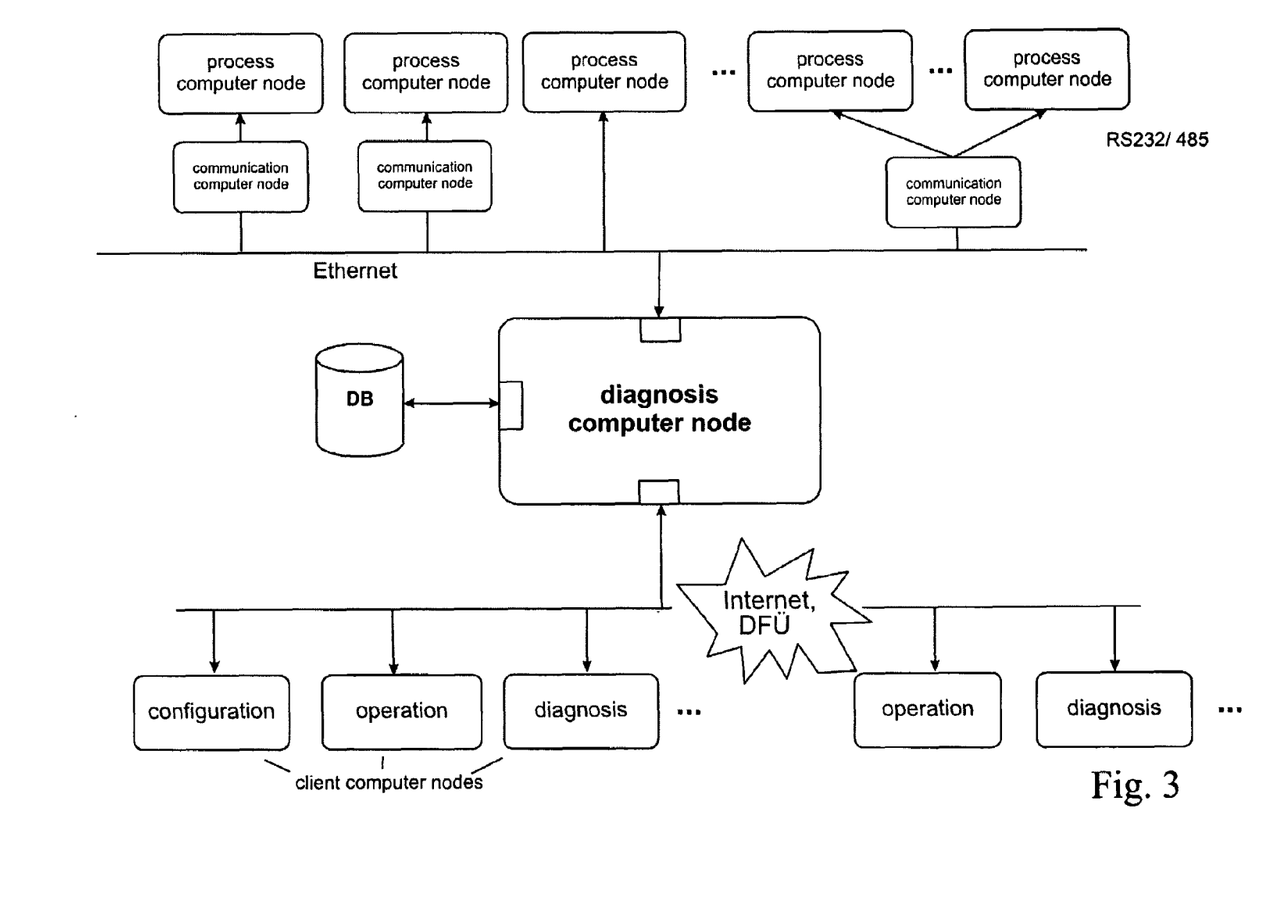
FIG. 3 shown in schematic block representation, the basic structure of the diagnosis system according to the invention.

FIG. 3 gives an overview of the basic structure of the diagnosis system. The user has various web-based user interfaces available, which present him with the functionality of the diagnosis system in a manner suited to him. For operation of the system, it is unimportant whether the user is local to the appliance or at another location.

The functions desired by the user are forwarded by the user interfaces to the diagnosis computer node. Here, every functionality which is available in the interface is implemented. Further, the diagnosis computer node undertakes to store all the data occurring in the database DB. All data specific to the appliance such as for example the appliance configuration or component databases, all data specific to diagnosis such as e.g. long-term records or ring memory records and all data relating to application, are managed in the database.

If relevant data are made available for diagnosis by the control or control station e.g. of a printing press, these can be further processed by special components incorporated in the diagnosis computer node.

The tasks incoming from the user interface at the diagnosis computer node are processed there and converted into commands that will be understood by the corresponding regulator. The communication between diagnosis computer nodes and communication computer nodes with a connected regulator is effected via Ethernet and XML protocols supported thereon. At the communication computer node, the tasks received from the application server are carried out and the result is sent back to the diagnosis computer node.

Each of the supported process computer nodes, e.g. regulators, must offer an XML-based interface in order to permit the diagnosis computer node access to the required data. This can be effected e.g. by means of a communication computer node ("communication PC"), which is either incorporated in the process computer node (e.g. b maXX 4600) or is added to the process computer node as a plug-in card. Alternatively, the XML-based interface of the process computer node can also run without communication PC hardware as part of the diagnosis computer node. The communication between the interface units on the diagnosis computer node and the process computer node hardware is then carried out via proprietary protocols and RS232 or Ethernet.

The requirements mentioned in the introduction require a component-based, distributed architecture of the diagnosis system. According to the general principles of software development, data capture, data processing and data storage and the user interfaces are in modular form and are separate from one another. Thus a transparent and more calibratable structure is achieved, which can be easily extended by further functionalities. It can thus be ensured that the diagnosis system grows along with the increasing number of drives (calibratability). By the use of Ethernet and TCP/IP for the communication between the communication PCs, the diagnosis computer node and the applications, there is a substantially larger bandwidth available for data transmission. This results in a substantially faster diagnosis system than that of DE 196 14 748 mentioned in the introduction.

Further, the component-based structure simplifies coverage of the large function scope of the diagnosis system. For every user group, an user interface tailored to their individual needs can be developed, which has access to the underlying infrastructure (diagnosis computer node).

By separating user interface and implementation of the functionality in the diagnosis computer node, new applications can be developed in future with less expense. By using modem software technologies, the Internet can be used as a communication medium that is available and accepted worldwide. Thus it is not important whether monitoring of the appliance is carried out locally on site or from another site, e.g. the service department. By using current Internet browsers for the user interfaces, the installation costs for the user are substantially reduced and the number of hurdles for the user in using the diagnosis system is significantly reduced.

The component-based architecture furthermore permits the support of newly developed methods of monitoring and diagnosing drives in that new functions are incorporated as components in the diagnosis computer node.

Substantial advantages of the diagnosis system according to the invention consist in particular in the following:

The client has universal access by the web interface to the diagnosis functions:

The right information close to time at the right place
Simple user interface by way of web browsers
User guidance simplifies operation and configuration
The web interface is platform-independent
Operation possible via the Internet if desired.

(2) The client receives data concerning the state of the appliance which have been prepared for him:

Data preparation in the form of graphic representations
Prophylactic diagnosis.

(3) The substantially extended diagnosis options permit:
Extended monitoring of the appliance
Simpler localisation of the cause in the case of an error.

(4) The functions for installation support permit:
Faster installation→reduction in costs
Improved quality of installation by specified and documented acceptance protocols.

A function group "software update" permits the installation or updating of a firmware of the process computer node e.g. to firmware. All actions carried out in this function group are detected in a log file. It is a precondition for installation or updating of the firmware that the regulators selected have unambiguous regulator identification. The following actions must be possible:

Selecting drives
The user selects the drives to be updated from a drive list.
2. Selecting firmware
The user selects the firmware which is to be loaded on to the drives to be updated.
3. Carrying out the software update
After the display of a warning notice, the software update is carried out.

A function group "configure events" offers the option of recording any events in the events display and in the logbook. The event broker present in the communication PC of the respective process computer node is configured by means of the functions mentioned below, so that it monitors the desired parameter combinations for occurrence of the configured event. If the event does occur, it is sent to the diagnosis computer node and is displayed there in the event display. The following actions may be possible for example:

Selecting drives
The user selects the drive for which an event is to be configured or deleted.
2. Configuring event
The user configures an event by means of a configuration wizard
3. Deleting event
The user deletes an event from a list with current events. Events which are present as standard, e.g. errors, cannot be deleted.

4. Sending event configuration to drive
The user sends the configured event to a drive selection and activates the same.

A function group "scripts" offers the option of carrying out complex diagnosis functions. In order to make complex enquiries of parameters, PERL scripts can be written which are sent to the corresponding communication PC and are executed there. The following actions are to be possible:

Loading of the script on to the server
The user loads the script from the communication PC of a drive on to the server.
2. Loading of the script to the drive
The user loads a script selected from a list on to a selected drive.
3. Editing script
The user edits a script.
4. Execution of the script on the communication PC
The user starts the script on a drive.

Below, an overview of the architecture of the diagnosis computer node of the diagnosis system is given. FIG. 1 shows a detailed structure of the diagnosis system. It consists substantially of three planes:

Client computer node with user interfaces
All functionalities of the diagnosis system can be operated via the user interfaces. For the user of the diagnosis system it should make no difference whether he is at the appliance in the local network or is connected to the application server via the Internet or a telephone dial-up connection.

Diagnosis computer node
This is the core of the whole application. Its functionality is divided into various components (managers). Each manager is self-contained and makes available its functionality to the web-based user interface or to other server components. All data necessary for the function of the manager are stored in the connected database. In order to ensure encapsulation and consistency of these data, access is only permitted to these databases via the functions made available by the manager. This also ensures that a change in the database structure of one manager does not automatically lead to changes at other managers.

In order to make available the functionalities of the managers to the user interfaces, a suitable infrastructure must be created (Tomcat Servlet container). For communication with the web interface for installation, monitoring and diagnosis, an Apache web server is to be used. This makes available HTML pages in which Java Applets are embedded. The data to be displayed on the interface is transmitted by means of SOAP (Simple Object Application-Protocol) to the appropriate units. The user interface retrieves e.g. a function of the appliance manager. The parameters to be transferred and the reference of the function are sent to the Intra- or Internet by means of the SOAP protocol. In order to ensure the transparency of current firewalls, the function retrieval is sent in the form of an HTTP telegram. A web server on the site of the application server receives the HTTP telegrams with the SOAP content and forwards them to the SOAP handler. The SOAP handler in the Tomcat Servlet container decodes the enquiry and retrieves the desired function from the appliance manager. The function is executed and the return values are in turn converted into the SOAP protocol and sent to the interface as an HTTP telegram.

An essential property of a diagnosis and monitoring system is that the user is informed close to time of events occurring at the appliance. This presents a problem for the architecture described above, since both for communication via SOAP and for the HTML pages, there is no event-based reporting.

As a remedy, events occurring at the appliance, e.g. the occurrence of an error or the update of a parameter value in one interface, must be communicated via an event channel to the user interfaces or constantly polled.

Process computer node

The process computer node plane makes available to the diagnosis computer node the data from the process computer node. The process computer node must be connected. As already indicated, the diagnosis computer node consists of various encapsulated server components (managers) which make their functionalities available via the Tomcat Servlet container to the user interface or client computer node. The component-based structure is intended to ensure that the function scope of the diagnosis system can be extended. The managers are realised as Java components. The individual managers are described below.

The appliance manager contains all the necessary data about the configuration of the appliance. This contains data concerning the components present in the appliance, the grouping of components, addresses, etc. Functionalities are to be made available which permit the appliance configuration to be represented in the form of various overview images. Furthermore, all documentations are to be made available to the data contained in the appliance.

In planning the appliance manager, it should be ensured that by means of the functionalities of this component any appliances can be described in the field of drive technology.

The event manager administers all events occurring in the diagnosis system such as e.g. error messages or maintenance events. It gathers all events that have occurred in the form of logbooks and makes them available to the user in a configurable representation. Further, the event manager has functions by means of which any event monitoring can be defined which is then configured by the event manager on the corresponding regulators.

The record manager makes available functions by means of which any parameters from any regulators can be recorded. It offers various types of record which can be configured by the user. All data occurring in a record are stored by the record manager in a database and if required made available to other units, e.g. a graphics unit of the interface.

All functionalities in the diagnosis system are protected against unauthorised access. Every user has a user identity and belongs to a user group which allows him a rights profile for access to the functionalities of the manager. These data are configured and stored in the user manager. Every function in the managers has an unambiguous identification. If a user wants access to a function, first the user manager is asked whether the user has the appropriate rights to carry out this function. The database in which the user data are stored is to be password-protected against unauthorised access.

The logging manager gathers all logging data from the connected regulators and stores their log and debug messages in a database or in rolling log files.

Figure 5:
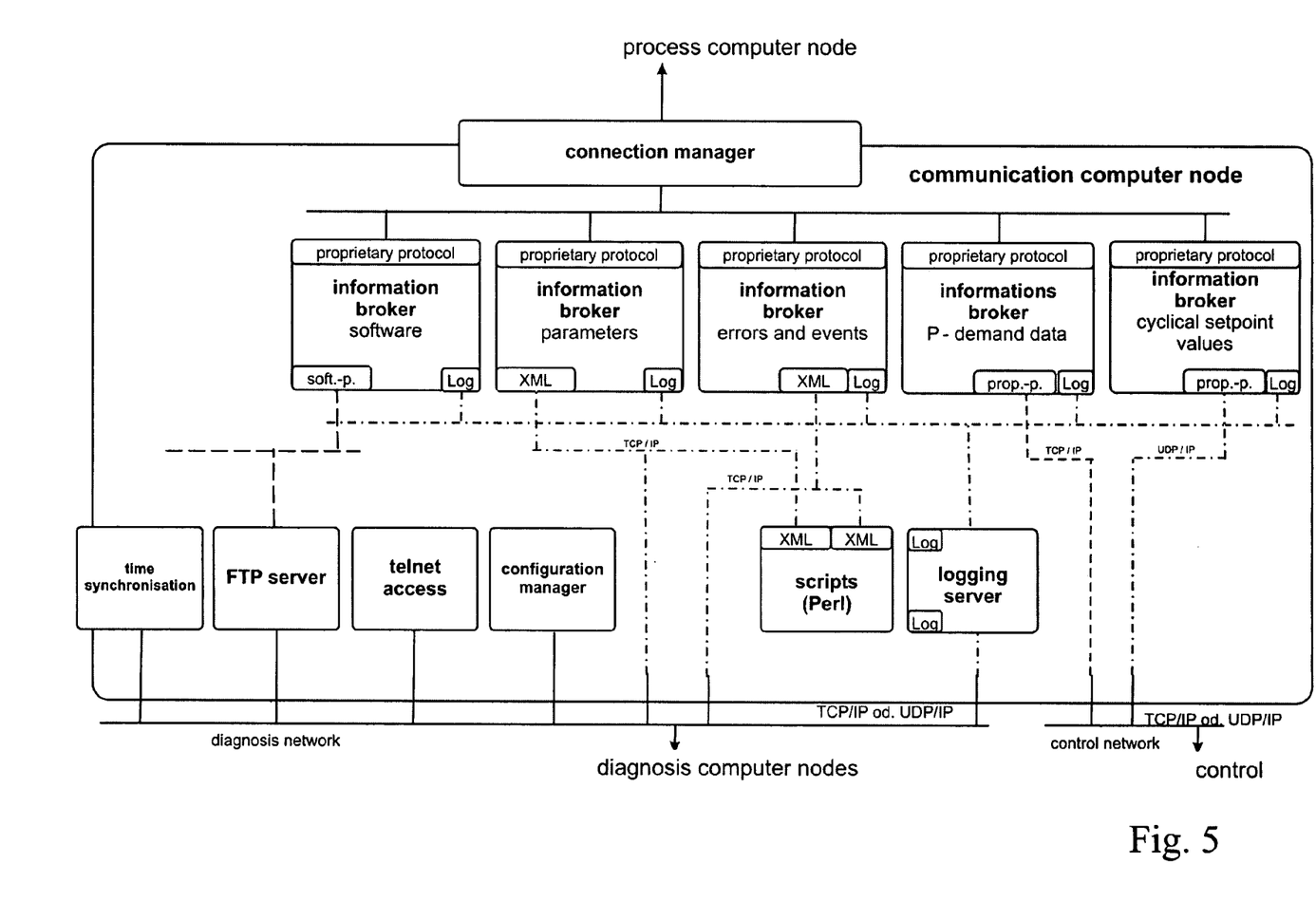
FIG. 5 a similar block diagram of the internal structure of the communication computer node.

The communication computer node or communication PC according to FIG. 5 carries out communication tasks between the process computer node and the outside world. The software structure for communication with the process computer node is described below.

Each appliance that is to communicate with the process computer node must respond thereto via a suitable software interface on the communication PC. By means of the communication PC, almost any software interface based on the Ethernet or a serial interface can be realised. The software architecture on the communication PC is described below.

Classification into the overall concept can be deduced from the comments above. FIG. 5 shows the software structure on the communication PC or the process computer node.

Any functionality which is to be made available by the process computer node is realised in a software module (information broker or manager). For example, the information broker makes "parameters" available to a parameter interface via which any parameter of the process computer node can be read and written. The information broker "errors and events" presents any events and errors to the outside. The two information brokers "parameter demand data" and "cyclical setpoint values" carry out communication with the control. They are only available on the regulators which form the master in the sercos ring and thus must communicate with the control. The information broker "software download" delivers functions for automatic up- and download of the regulator firmware. A parameter manager (not shown) acts as internal management of the regulator parameters on the flashcard. It is not relevant to the communication with the outside world.

The communication of the information brokers "parameters", "error and event" and "software download" with the outside world is effected via XML-based protocols. All enquiries or responses are transmitted in XML messages defined by means of an XML model.

Each of the available brokers can process more than one enquiry at a time from one or more clients. Essentially, the communication PC of the process computer node communicates with the control and the diagnosis computer node. In communication with an SPS control, it must be ensured that the messages are processed in each case without an unnecessary time lag at a process of the process computer node, as these are of substantial significance for operation of the appliance. Since the enquiries can only be processed sequentially on the processor of the process computer node, it must be possible to process enquiries from the SPS control in strict precedence. This should be ensured by allocating priorities for the enquiries. Each enquiry to one of the brokers on the communication PC is provided with a priority. According to this priority the enquiry is preferred or treated as subordinate.

In addition to the information brokers, there are further, in part optional, software modules on the communication PC:

A logging server receives log and debug messages from the information brokers and makes them available to the outside world.

A web server offers a simple web interface for operation and configuration.

An FTP server gives simple up- and download of firmware on to the process computer node.

A client for time synchronisation supplies a matching time to all communication PCs of an appliance.

By means of a PERL interpreter, any scripts can be carried out with diagnosis or control functionalities.

The configuration manager carries out starting of important services (e.g. automatic configuration of event monitoring for an error in the technical- physical process) and management of the configuration data of the individual software modules.

A Telnet access is available for maintenance purposes.

The software modules of the communication PCs are described below.

The object of the information broker "parameters" is to prepare XML-based parameter interface for access to the parameters of the process computer node. As protocol, an XML-based protocol defined by means of an XML model is used, which communicates via TCP/IP with the client. From the viewpoint of the client, the following functions should be available:

Reading of parameters

The information broker "parameters" should be able to read a group of any parameters from the processor of the process computer node. In this case, in addition to once-only reading, the cyclical reading of parameters should be possible. The client is to be able to set the interval between reading operations and the number of reading operations.

Writing of parameters

The information broker "parameters" should be able to write a group of any parameters on to the process computer node.

The task of the information broker "errors and events" is to prepare an XML/based interface, via which a client is informed of events occurring at the regulator, without constantly having to enquire of the regulator. As a protocol, an XML-based protocol defined by means of an XML model is used, which communicates with the client via TCP/IP. From the viewpoint of the client, the following functions are to be available:

Configuration of event monitoring

At the information broker "event", it will be possible to specify any entry conditions for an event, upon the occurrence of which a message is sent to the client. If the event has occurred, in addition to the parameters taking part in the entry condition, it will be possible to scan further parameters from the regulator.

An accepted task will be confirmed by the broker.

The information broker "event" will have extensive functionalities which offer the client wide-reaching possibilities of forming entry conditions. An entry condition will be composed of plural parts, which can be linked together logically by AND or OR. Within each partial condition, the value of the parameter currently scanned can be compared either to a comparative value sent within the configuration message or to the most recently read parameter value. Optionally, a tolerance limit can be taken into account, which is settled with the comparative value. For the comparison, both all logical operators (<,>,<=, >=, |=) and the comparison to a bit mask are to be carried out. In addition, for each partial condition, a trigger mode is to be taken into account which indicates whether the event is to be sent the first time the event condition is encountered, upon disappearance of a condition already encountered, or in both cases.

Notification of an event

When the configured event condition is encountered, an XML message is to be sent to the client.

Ending of event monitoring

By means of an XML message provided for this purpose, event monitoring in progress can be ended.

Enquiry of the status of event monitoring

By means of an XML message provided for this purpose, the client can enquire of the information broker "event" whether event monitoring is in progress or has already finished.

A difference from the information broker "parameters" is that there is no permanent socket connection to the client. After the configuration of the event, this is dismantled and only if the configured event arises is it re-assembled. To this end, on the part of the client a corresponding server port must be available.

The information broker "cyclical setpoint values" effects part of the communication with the control. It is used in particular with printing press applications provided there is a process computer node or regulator which is a sercos master in a drive ring.

The task of the information broker "cyclical setpoint values" is to supply the regulator at regular time intervals with new setpoint values from the control. In this case, it receives telegrams sent from the control and forwards them to the regulator. It should have the following capabilities:

Receiving of setpoint value telegrams from one or more controls

The information broker "cyclical setpoint values" will be capable of receiving setpoint value telegrams from one or more controls. The communication with the control may run via a proprietary protocol and/or the protocol UDP/IP.

Forwarding of setpoint values to the regulator

All setpoint value telegrams received by a control SPS will be forwarded with the highest priority to the process computer control or regulator.

Monitoring of the setpoint value telegrams

For diagnosis purposes, it will be possible to forward the incoming telegrams from the control both to the regulator and additionally to the diagnosis system.

The information broker "parameter demand data" effects some of the communication with the control. It is used particularly in printing press applications provided it is a process computer node or regulator which is the sercos master in a drive ring.

The task of the information broker "parameter demand data" is to make available any parameter values to one or more controls close to time. It will have the following capabilities:

A control client sends any parameters in a requirement telegram to the information broker. This requests the parameter values with a high priority from the regulator and sends back a reply telegram to the control client. For communication with the control client, a proprietary protocol and/or TCP/IP may be used.

Monitoring of the requirement telegrams

For diagnosis purposes, it will be possible to forward the incoming telegrams from the control both to the process computer node or regulator and additionally to the diagnosis system.

The task of the information broker "software download" is to transmit the regulator firmware and complete data records between the diagnosis computer node and the regulator. The transmission of data is effected by means of the FTP protocol. It will have the following capabilities:

Download of a regulator firmware to the regulator as process computer node

The download of regulator firmware is effected in two stages: first by means of an FTP client the firmware is transferred in a list on the flashcard of the communication PC. In the second stage, the information broker "software download" is instructed by means of an XML telegram to change the boot settings of the regulator in such a manner that the next time the regulator is booted up the new firmware is started.

Upload of a regulator firmware as process computer node

The upload of a regulator firmware is effected direct via the FTP protocol. In this case, no support on the part of the information broker "software download" is necessary.

Download of a complete data record

As in the download of a regulator firmware, the download of a parameter data record likewise takes place in two stages:

First, by means of an FTP client, the data record in a list on the flashcard of the communication PC is transferred. In the second stage, the information broker "software download" is instructed by means of an XML telegram to change the settings of the regulator in such a manner that the next time the regulator is booted up the new data record is taken into account.

Upload of a complete data record

The upload of a data record is effected direct via the FTP protocol. In this case, no support on the part of the information broker "software download" is necessary.

The task of the connection manager is to administer the interface to the regulator or process computer node. In this it will be possible to manage various physical interfaces (e.g. serial, Ethernet or SPI). Each enquiry to the connection manager is provided with one or 5 priority levels. Enquiries with the highest priority are sent by the connection manager to the (digital signal) processor process computer node before all other enquiries awaiting a response. Enquiries with a low priority are always dealt with after all other tasks awaiting. Thus it can be ensured that a task with the highest priority, e.g. from the control, is always processed as the next enquiry on the process computer node.

In the process computer node, as a memory means a flashcard is allocated to the communication PC due to the improved support by the Intel PXA 255. However, for the process computer node or regulator, there has to be an option of reading parameters from the flashcard and to write them on to the flashcard. This is ensured by means of the parameter manager.

Further services on the communication PC

Logging servers

All notices generated in the information broker processes are formatted and written to the console, into a log file or a message queue of the log server. This log server can then send the messages to any servers/computers.

In order to permit subsequent evaluation of the log files, various message types are specified which simplify the interpretation of the messages (e.g. debug, data, error . . . ).

Script support

By means of script support on the communication PC, a versatile and freely programmable interface is to be created, with which future requirements of monitoring and diagnosis are to be covered. By means of a PERL interpreter, any scripts can run on the communication PC, which have access to the functionalities of the information brokers "parameters" and "errors and events". Thus relatively complex monitoring functions can be carried out locally on the communication PC without loading the network by transmitting data. The scripts are transmitted by means of the FTP server to the communication PC or are already present there as part of the software.

Due to the strenuous requirements for performance and system resources of the communication PC, the script support is only to be used for special diagnosis tasks.

Time synchronisation, FTP server, Telnet

For synchronisation of the system times, all communication PCs will synchronise their system time regularly via a time server running on the BAUDIS.

The FTP server and Telnet access serve for software updating of the communication PC and for maintenance.

Diagnosis data arising during operation of the drive system (e.g. errors or diagnosis information such as e.g. temperature, speed, contouring error, deviation from rules) are polled by the communication PC on the process computer node or drive regulator and converted into an XML-based protocol. The communication PC makes the diagnosis data available to the diagnosis computer node in an event-based manner (information broker "event") or in an enquiry-based manner (information broker "parameter").

In the managers of the diagnosis computer node, the diagnosis data are retrieved or received in an event-based manner from the communication PC of the drive regulator and are further processed (e.g. storage in the database, converted etc.). If diagnosis data are to be displayed on the user interface, the manager forwards the diagnosis data to the appropriate components in the Servlet container. There the data are prepared, so that they can be transferred by means of enquiry-based communication (polling) or by means of event-based communication (event channel) via the data remote connection to the Java Applets, which are embedded in the user interface.

Figure 6:
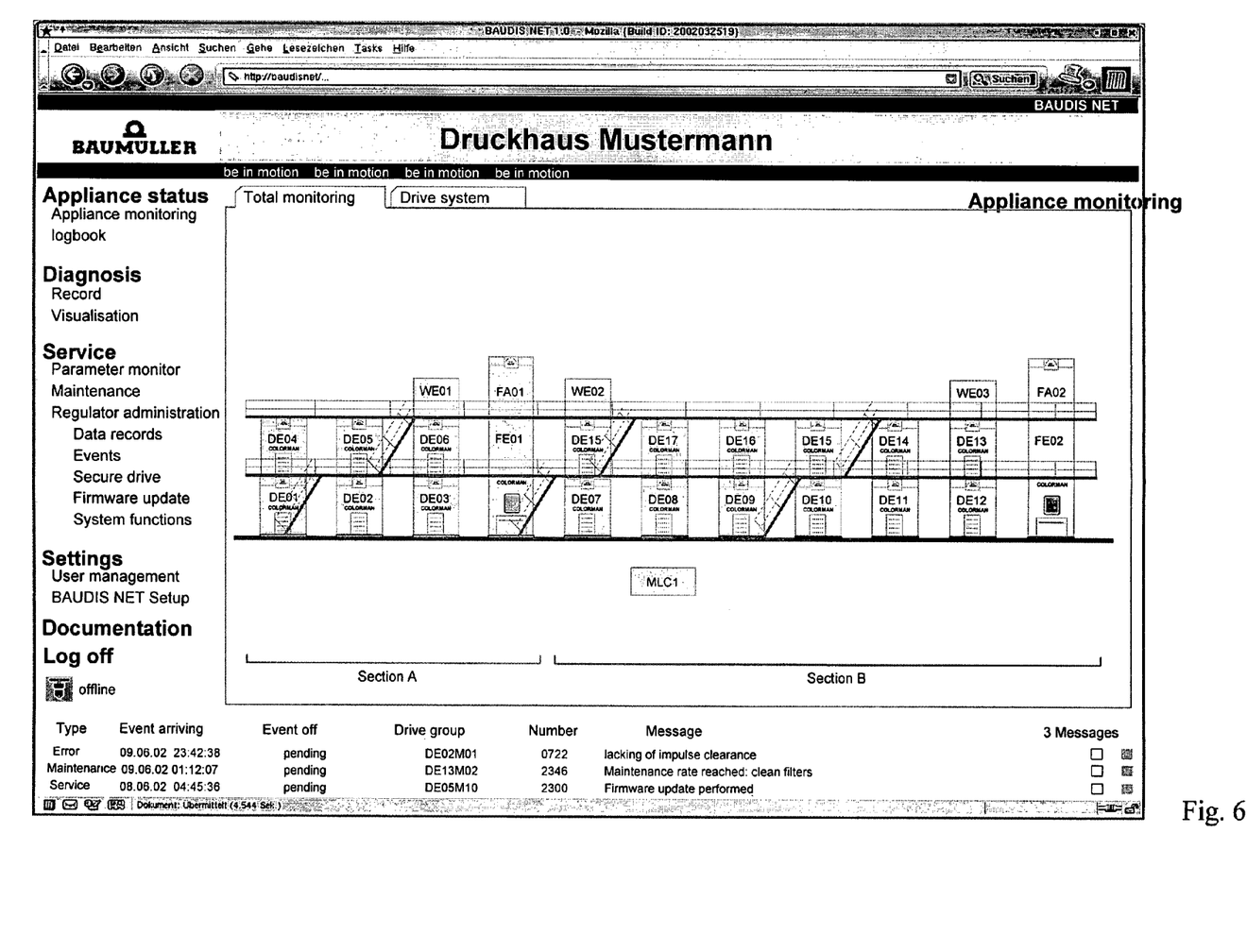
FIG. 6 a user interface, by way of example, on a client computer node for an appliance-based appliance image with the example of a printing press, generated by means of a Java-Applet in combination with a corresponding Servlet on the diagnosis computer node.
Figure 7:
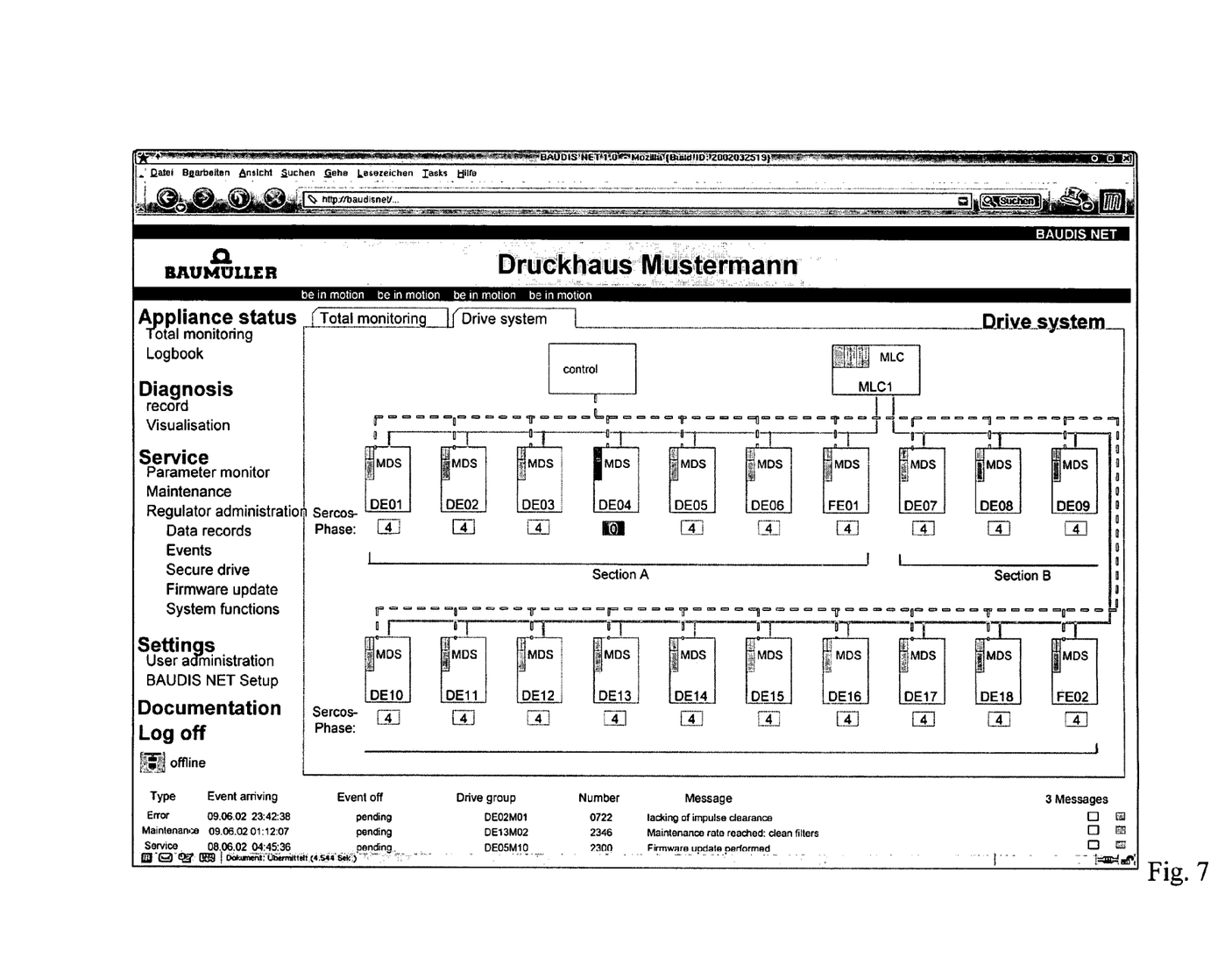
FIG. 7 a further, similarly generated user interface via a drive-system-based appliance image with the example of a printing press.

FIGS. 6 and 7 show web-based user interfaces which graphically prepare the required diagnosis data for the user. Thus the diagnosis system according to the invention becomes an instrument which increases the machine availability and also makes complex appliances with a large number of drives manageable. Thus with the user interfaces of the type shown in FIGS. 7 and 8, the machine control station can be supplied with data for the current machine status, or the production line can be provided with statistical data for machine availability and for maintenance cycles. But also the machine manufacturer or the drive supplier can thus have comfortable access to an appliance with a large number of technical-physical processes in order to afford rapid, efficient diagnosis and error correction during servicing. This is made possible by the user of modern web-based technologies or web-based user interfaces with their inherent versatility. Advantageously, the web interface can thus run on any client computer, independently of the respective client operating system. Installation of an user interface specific to the diagnosis system on the client computer node is no longer necessary. The web-based user interfaces are operable by the user in a customary and therefore easier manner due to the wide distribution by the Internet. The user interface can be adapted to the client's wishes at reasonable cost.

LIST OF REFERENCE NUMBERS axle
electric motor
converter
process computer node
communication computer node
switch cabinet
SPS Control computer node.

While certain preferred embodiments of the present invention have been disclosed in detail, it is to be understood that various modifications may be adopted without departing from the spirit of the invention or scope of the following claims.

Figure 4:
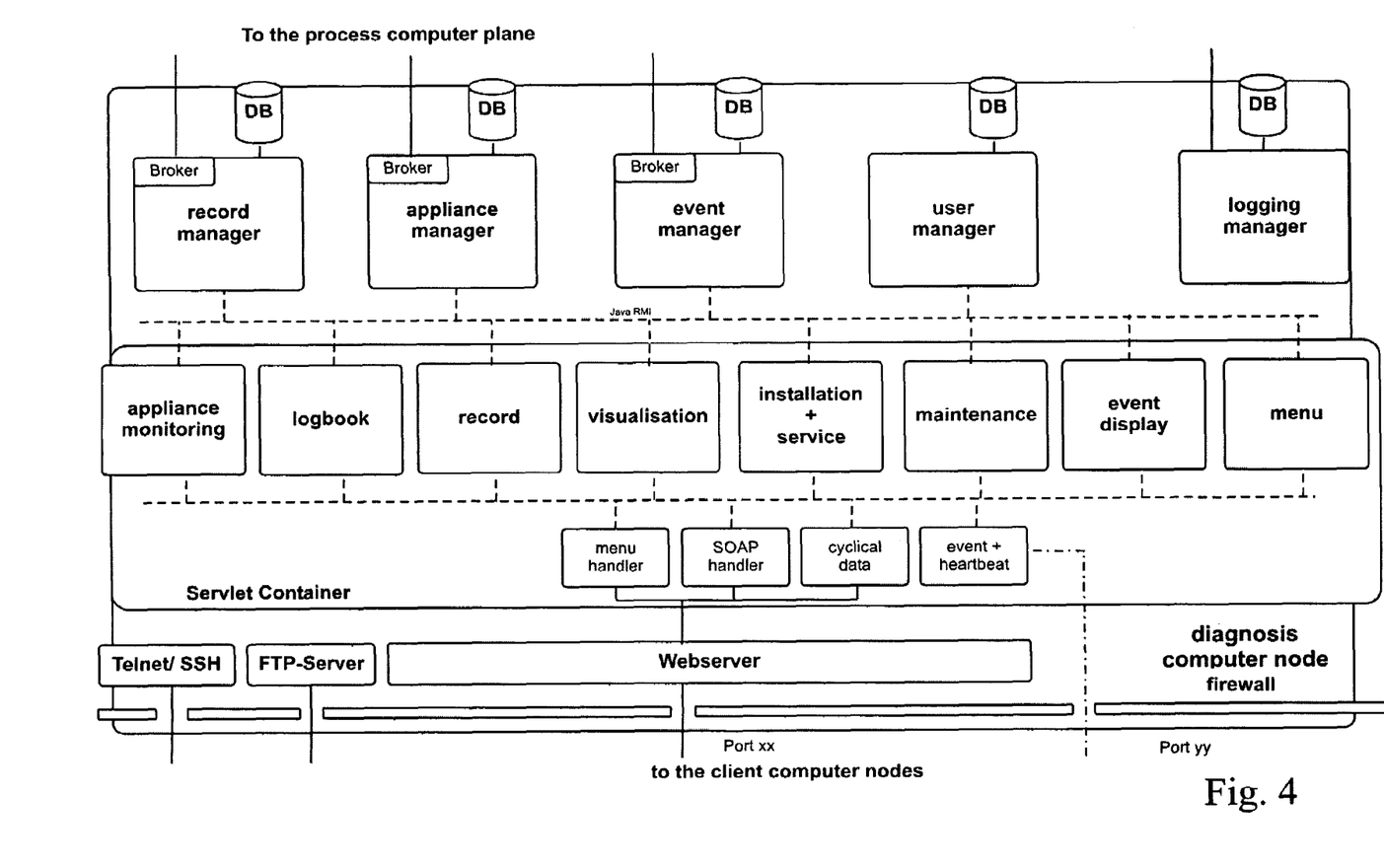
FIG. 4 a detailed block diagram of the internal structure of the diagnosis computer node.

Key to the Drawings
FIG. 1
Antriebs . . . —drive system
Diagnoserechnerknoten—diagnosis computer node
Leitstand—control station
Diagnose—diagnosis
Router od.ISDN/Analog—router or ISDN/analogue
Ferndiagnose—remote diagnosis
FIG. 2
Diagnoserechnerknoten—diagnosis computer node
Diagnosestationen—diagnosis stations
FIG. 3
Prozessrechnerknoten—process computer node
Kommunikationsrechnerknoten—communication computer node
Diagnoserechnerknoten—diagnosis computer node
Konfiguration—configuration
Bedienung—operation
Diagnose—diagnosis
Client-Rechnerknoten—client computer node FIG. 4
Zur Prozess . . . —To the process computer plane
Aufzeichnugs . . . —record manager
Anlagenmanager—appliance manager
Ereignis . . . —event manager
Benutzer . . . —user manager
Logging . . . —logging manager
Anlagenubersicht—appliance monitoring
Logbuch—logbook
Aufzeichnung—record
Visualisierung—visualisation
Inbetriebnahme . . . —installation+service
Wartung—maintenance
Ereignisanzeige—event display
Menu—menu
Menuhandler—menu handler
SOAP-Handler—SOAP handler
Zyklische Daten—cyclical data
Event+Heartbeat—event+heartbeat
Diagnose-Rechner . . . —diagnosis computer node
Firewall—firewall
Zu den . . . —to the client computer node
FIG. 5
Prozess . . . —process computer node
Kommunikations . . . —communication computer node
Proprietares protokoll—proprietary protocol
Informationsbroker—information broker
Parameter—parameters
Fehler U. Events—errors and events
Bedarfsdaten—demand data
Zyklische Sollwerte—cyclical setpoint values
Zeitsynchronisation—time synchronisation
Telnet-Zugang—Telnet access
Konfigurations . . . —configuration manager
Skripte—script
Logging Server—logging server
Diagnose-Netz—diagnosis network
Diagnose-Rechnerknoten—diagnosis computer node
Steuerungs-Netz—control network
Steuerung—control
FIG. 6
Gesamtubersicht—Total monitoring
Anlagenubersicht—appliance monitoring
(reading down the left-hand column)
Appliance status
Appliance monitoring
Logbook
Diagnosis
Record
Visualisation
Service
Parameter monitor
Maintenance
Regulator administration
Data records
Events
Secure drive
Firmware update
System functions
Settings
User management
BAUDIS NET setup
Documentation
Log off
FIG. 7
Antriebsystem—drive system
Column on left reads same as for FIG. 6

The invention claimed is:

1. A computer network for the configuration, installation, monitoring, error diagnosis and/or error analysis of plural technical-physical electric drive processes, which run under the control, regulation and/or monitoring by plural process computer nodes (4), which are connected via at least one shared communication system to at least one diagnosis computer node in which one or more configuration, monitoring, diagnosis service(s) and/or function(s) are implemented, which are allocated to the processes and/or the process computer nodes (4) and/or to the data processing operations running therein, characterised in that:
   (a) the shared communication system is realised by an Ethernet or another bus or communication system operating asynchronously and/or with a stochastic access method;
   (b) a communication unit or computer node is interconnected between the Ethernet or other bus or communication system and at least one of the process computer nodes (4) and connects the process computer node (4) to the Ethernet or other bus or communication system;
   (c) the communication unit or communication computer node (5) is formed for communication with the diagnosis computer node via XML protocols and/or as an XML-based interface; and
   (d) the communication computer node (5) is formed as an additional component for the respective process computer node (4).

2. A network according to claim 1, characterised in that the communication unit or communication computer node (5) is formed for enquiry-based or event-based communication with the diagnosis computer node.

3. A network according to claim 1, characterised in that the communication unit is capable of running entirely or in part on the hardware of the process computer node and/or diagnosis computer node.

4. A network according to claim 1, characterised in that for each data exchange each communication unit is allocated a process computer node (4) and/or a technical-physical process or each communication computer node (5) is allocated at least one technical-physical process or a process computer node (4).

5. A computer network for the configuration, installation, monitoring, error diagnosis and/or error analysis of plural technical-physical electric drive processes, which run under the control, regulation and/or monitoring by plural process computer nodes (4), which are connected via at least one shared communication system to at least one diagnosis computer node in which one or more configuration, monitoring, diagnosis service(s) and/or function(s) are implemented, which are allocated to the processes and/or the process computer nodes (4) and/or to the data processing operations running therein, characterised in that:
   (a) the shared communication system is realised by an Ethernet or another bus or communication system operating asynchronously and/or with a stochastic access method;
   (b) a communication unit or computer node is interconnected between the Ethernet or other bus or communication system and at least one of the process computer nodes (4) and connects the process computer node (4) to the Ethernet or other bus or communication system;
   (c) for each data exchange each communication unit is allocated a process computer node (4) and/or a technical-physical process or each communication computer node (5) is allocated at least one technical-physical process or a process computer node (4); and (d) at least one of the communication computer nodes (5) is connected to plural process computer nodes via a serial communication system.

6. A network according to claim 5, characterised in that the communication unit or communication computer node (5) is provided with functionalities for an error search or diagnosis in a region of at least one of the process computer nodes and/or technical physical processes.

7. A network according to claim 5, characterised in that the diagnosis computer node is formed for delivering or supporting web-based user interfaces in particular via data remote transmission or a long-distance traffic network and is provided with the function components corresponding to the user interfaces.

8. A network according to claim 5, characterised by a structure corresponding to a client/server architecture with the diagnosis computer node as server.

9. A diagnosis computer node connected to a computer network, which utilizes a structure corresponding to a client/server architecture, for configuration, installation, monitoring, error diagnosis and/or analysis of plural technical-physical electric drive processes, which run under control regulation and/or monitoring by plural process computer nodes (4), said computer network comprising at least one communication computer node (5), wherein said diagnosis computer node is formed as a server with interfaces to at least one database, for communication with the communication and/or process computer nodes and other client computer nodes, wherein interfaces to the other client computer nodes are formed as Servlet containers, which provide transmission of diagnosis data obtainable from the interfaces for communication with the communication and/or process computer nodes to the client nodes, and the one or more interfaces to the communications and/or process computer nodes or communication units are realised on the basis of the Ethernet, comprising:
(a) a diagnosis channel, which is formed by:
one or more Ethernet interfaces allocated to the communication and/or process computer node (4);
an event management unit with database access, which is formed for processing the diagnosis data obtained at the Ethernet interfaces; and
an event monitoring unit applied on the basis of the Servlet container, which makes available output data from the event management unit to one or more Applets on external client computer nodes; and
(b) an appliance management unit having information data via the configuration of the technical-physical processes together with associated process computer nodes (4) and one or more function components, which are formed to visualise the configuration in combination with the client computer node and/or for keeping ready the information data for further data processing operations.

10. A computer node according to claim 9, characterised in that a web server for generating and forwarding data obtained from HTML pages by the Servlet container is connected downstream of the Servlet container.

11. A computer node according to claim 9, characterised in that the interfaces are installed for communication with the communication and/or process computer node via XML protocols and/or the interfaces for communication with the client computer nodes via SOAP (Simple Object Process Protocol).

12. A computer node according to claim 9, characterised by a communication unit installed by program or software technology in such a manner that thereby one or more of the process computer nodes (4) can be connected to the Ethernet or other bus communication system.

13. A communication computer node (5) or communication unit as a software and/or firmware module, connected to a computer network for configuration, installation, monitoring, error diagnosis and/or analysis of plural technical-physical electric drive processes, which run under control, regulation and/or monitoring by plural process computer nodes (4), which are connected via at least one shared communication system to at least one diagnosis computer node in which one or more configuration, monitoring, diagnosis services and/or functions are implemented which are allocated to the processes and/or the process computer nodes (4) and/or to the data processing operations running therein, said shared communication system being realized by an Ethernet or other bus or communication system operating asynchronously and/or with a stochastic access method characterised by:
the communication computer node or communication unit comprising a first interface which is allocated to the at least one diagnosis computer node and which is programmed for communication via protocols of the TCP/IP family, including UDP/IP and by one or more second interfaces allocated to one or more of the process computer nodes (4), wherein the first and the one or more second interfaces may be coupled together via one or more information brokers, which are each formed by program and/or circuit technology as sub-units for bidirectional enquiry-based and/or event-based data communication between the first and second interface and wherein the second interface is formed for connection to a serial communication system.

14. A communication computer node (5) or communication unit according to claim 13, characterised in that the first interface is formed for communication on the basis of XML protocols.

15. A communication computer node (5) or communication unit as a software and/or firmware module, connected to a computer network for configuration, installation, monitoring, error diagnosis and/or analysis of plural technical-physical electric drive processes, which run under control, regulation and/or monitoring by plural process computer nodes (4), which are connected via at least one shared communication system to at least one diagnosis computer node in which one or more configuration, monitoring, diagnosis services and/or functions are implemented which are allocated to the processes and/or the process computer nodes (4) and/or to the data processing operations running therein, said shared communication system being realized by an Ethernet or other bus or communication system operating asynchronously and/or with a stochastic access method characterised by:
the communication computer node or communication unit comprising a first interface which is allocated to the at least one diagnosis computer node and which is programmed for communication via protocols of the TCP/IP family, including UDP/IP and by one or more second interfaces allocated to one or more of the process computer nodes (4), wherein the first and the one or more second interfaces may be coupled together via one or more information brokers, which are each formed by program and/or circuit technology as sub-units for bidirectional enquiry-based and/or event-based data communication between the first and second interface and wherein the one or more information brokers comprise one or more function components, which are formed for error search or diagnosis in a region of the process computer nodes and/or technical-physical processes.

16. A communication computer node (5) or communication unit as a software and/or firmware module, connected to a computer network for configuration, installation, monitoring, error diagnosis and/or analysis of plural technical-physical electric drive processes, which run under control, regulation and/or monitoring by plural process computer nodes (4), which are connected via at least one shared communication system to at least one diagnosis computer node in which one or more configuration, monitoring, diagnosis services and/or functions are implemented which are allocated to the processes and/or the process computer nodes (4) and/or to the data processing operations running therein, said shared communication system being realized by an Ethernet or other bus or communication system operating asynchronously and/or with a stochastic access method characterised by:

the communication computer node or communication unit comprising a first interface which is allocated to the at least one diagnosis computer node and which is programmed for communication via protocols of the TCP/IP family, including UDP/IP and by one or more second interfaces allocated to one or more of the process computer nodes (4), wherein the first and the one or more second interfaces may be coupled together via one or more information brokers, which are each formed by program and/or circuit technology as sub-units for bidirectional enquiry-based and/or event-based data communication between the first and second interface and wherein plural information brokers are installed with different functionalities and are connected to a connection manager, which is formed by program or circuit technology as a sub-unit for carrying out pre-determinable priority stages, according to which a specified one of the plural information brokers may be connected to the second interface(s) and each have a communication requirement at the process computer node(s) (4).

17. A communication computer node (5) or communication unit as a software and/or firmware module, connected to a computer network for configuration, installation, monitoring, error diagnosis and/or analysis of plural technical-physical electric drive processes, which run under control, regulation and/or monitoring by plural process computer nodes (4), which are connected via at least one shared communication system to at least one diagnosis computer node in which one or more configuration, monitoring, diagnosis services and/or functions are implemented which are allocated to the processes and/or the process computer nodes (4) and/or to the data processing operations running therein, said shared communication system being realized by an Ethernet or other bus or communication system operating asynchronously and/or with a stochastic access method characterised by:

the communication computer node or communication unit comprising a first interface which is allocated to the at least one diagnosis computer node and which is programmed for communication via protocols of the TCP/IP family, including UDP/IP and by one or more second interfaces allocated to one or more of the process computer nodes (4), wherein the first and the one or more second interfaces may be coupled together via one or more information brokers, which are each formed by program and/or circuit technology as sub-units for bidirectional enquiry-based and/or event-based data communication between the first and second interface and further comprising a software information broker for bidirectional transmission of firmware or other data or complete data records from the first to the second interface(s).

18. A communication computer node (5) or communication unit according to claim 17, characterised in that an FTP (File Transfer Protocol) server is interconnected between the software information broker and the first interface.

19. A communication computer node (5) or communication unit according to claim 17, characterised by the provision of a non-volatile write/read memory, in particular flashcard memory, with which one or more of the information brokers communicate.

20. A communication computer node (5) or communication unit according to claim 17, characterised by a parameter information broker for realising an interface which is XML-based for the reading and/or writing of parameters in one or more allocated process computer nodes (4).

21. A communication computer node (5) or communication unit according to claim 17, characterised by an error/event information broker, which is formed for communication with an XML-based protocol on the basis of TCP/IP via the first interface and is provided with a test and trigger member which can be so configured from outside that if a predetermined event occurs, in the region of the process computer node(s) (4) and/or of the technical-physical process, automatically a corresponding message transmission is released to the first interface.

22. A communication computer node (5) or communication unit according to claim 17, characterised by the installation of an interpreter for the running of scripts which are formed for access to function elements and/or information data in the information broker(s) for the purpose of carrying out monitoring and diagnosis functions.

23. A communication computer node (5) or communication unit according to claim 22, characterised in that the interpreter may be so coupled to an FTP (File Transfer Protocol) server connected to the first interface that scripts received via the first interface may be executed.

24. A communication computer node (5) or communication unit according to claim 22 characterised by said communication computer node or communication unit being formed as an additional structural component for a respective process computer node (4) and/or structural incorporation with a process computer node.

25. A communication unit according to claim 22, characterised by implementation which is at least in part loadable on to the hardware of a process and/or diagnosis computer node.

* * * * *